United States Patent
Pierce et al.

[11] Patent Number: 5,950,906
[45] Date of Patent: Sep. 14, 1999

[54] REVERSIBLE BRAZING PROCESS

[75] Inventors: Jim D. Pierce; John J. Stephens; Charles A. Walker, all of Albuquerque, N.Mex.

[73] Assignee: Sandia Corporation, Albuquerque, N.Mex.

[21] Appl. No.: 08/859,454

[22] Filed: May 20, 1997

Related U.S. Application Data

[60] Provisional application No. 60/031,786, Nov. 25, 1996.

[51] Int. Cl.⁶ .............................. B23K 1/00; B23K 1/19
[52] U.S. Cl. ........................ 228/175; 228/177; 228/189; 228/191; 228/262.31; 228/264
[58] Field of Search ........................ 228/175, 177, 228/119, 191, 189, 262.31, 264

[56] References Cited

U.S. PATENT DOCUMENTS

| | | | |
|---|---|---|---|
| 3,479,730 | 11/1969 | Poth | 228/189 |
| 3,984,652 | 10/1976 | Graville | 228/175 |
| 4,209,123 | 6/1980 | Jay | 228/175 |
| 4,844,322 | 7/1989 | Flowers et al. | 228/119 |
| 4,872,606 | 10/1989 | Satoh et al. | 228/194 |
| 5,000,367 | 3/1991 | Bottum | 228/119 |
| 5,234,149 | 8/1993 | Katz et al. | 228/191 |

*Primary Examiner*—Samuel M. Heinrich
*Attorney, Agent, or Firm*—V. Gerald Grafe

[57] ABSTRACT

A method of reversibly brazing surfaces together. An interface is affixed to each surface. The interfaces can be affixed by processes such as mechanical joining, welding, or brazing. The two interfaces are then brazed together using a brazing process that does not defeat the surface to interface joint. Interfaces of materials such as Ni-200 can be affixed to metallic surfaces by welding or by brazing with a first braze alloy. The Ni-200 interfaces can then be brazed together using a second braze alloy. The second braze alloy can be chosen so that it minimally alters the properties of the interfaces to allow multiple braze, heat and disassemble, rebraze cycles.

20 Claims, 2 Drawing Sheets

REVERSIBLE BRAZING PROCESS

This application claims the benefit of U.S. Provisional Application No. 60/031,786 filed on Nov. 25, 1996.

This invention was made with Government support under Contract DE-AC04-94AL85000 awarded by the U.S. Department of Energy. The Government has certain rights in the invention.

BACKGROUND OF THE INVENTION

This invention relates to the field of brazing, specifically methods of brazing that are adapted for repeated disassembly and rebrazing cycles.

There are many methods for joining materials, including mechanical fasteners using mechanical interference of the parts, adhesives, welding, and brazing. Some mechanical fasteners used with elastomeric seals can result in a leakproof joint. The joint, however, is often not as strong as the surrounding material or requires significantly increased mass, and is therefore an expected mechanical failure point under high structural or thermal stresses. Welding can also result in a leakproof joint, and a joint that is substantially as strong as the materials. Welded joints must be cut apart for disassembly, making them unsuitable for applications requiring disassembly.

Brazed joints can provide hermetic joints that are substantially as strong as the materials. Additionally, brazed joints can generally be opened by heating the joint enough to remelt the brazing alloy. FIG. 1 (a,b,c) depicts a typical braze joint. In FIG. 1a, components 11, 21 are to be joined at surfaces 1, 2 using braze alloy 3. In FIG. 1b, components 11, 21 have been brought together and heated, melting braze alloy (not shown) and joining surfaces 1, 2 to form joint 4. Conventional component materials and braze alloys result in changed component material properties in the regions 12, 22 near joint 4. FIG. 1c shows components 11, 21 after subsequent heating and disassembly. Surfaces 1, 2 are separated, but the regions 12, 22 of changed component material properties remain. Rebrazing the joint now requires working with the regions 12, 22 of changed component material properties, often degrading the performance of any resulting rebrazed joint or assembly.

Many applications that require the advantages of brazed joints use high value components. Traditional brazing processes limit the number of disassembly/rebrazing cycles before the high value components are unusable. There is a need for a reversible brazing process that allows repeated disassembly and rebrazing cycles.

SUMMARY OF THE INVENTION

The present invention provides a reversible brazing process that allows repeated disassembly and rebrazing cycles. Interfaces are affixed to components to be joined. The interfaces can be joined to the components mechanically, or by processes such as welding or brazing. The interfaces are then brazed together in an inert atmosphere, an oxygen reducing atmosphere, or with fluxes, consequently joining the affixed components. The interface-to-interface braze joint can be heated and disassembled. The braze alloy used can be chosen so that it does not result in substantial change in the interface material properties, allowing rebrazing of the disassembled interface-to-interface joint.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a reversible brazing process that allows repeated disassembly and rebrazing cycles. FIG. 2(a,b,c) depict a brazing and disassembly process according to the present invention. The Figures show rounded components; those skilled in the art will appreciate that the process is suitable for joining components having a variety of shapes.

Figure 1A:
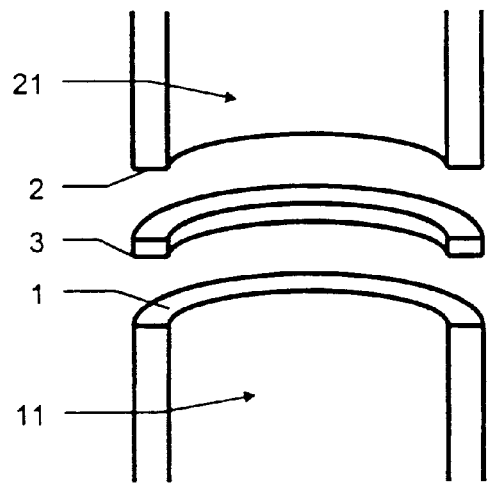
FIG. 1(a,b,c) depict an existing brazing and disassembly process.
Figure 1B:
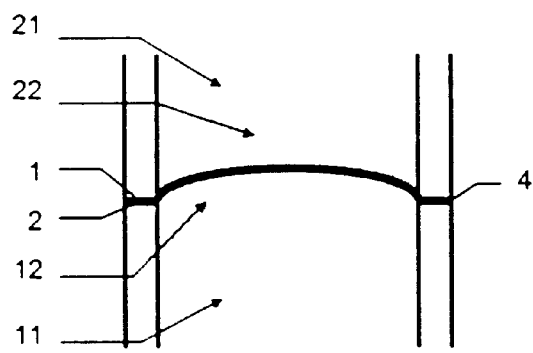
Figure 1C:
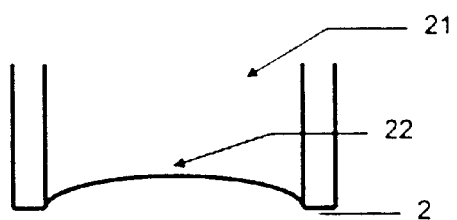
Figure 1C:
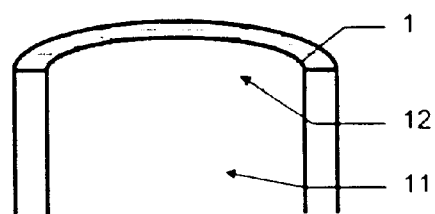
Figure 2A:
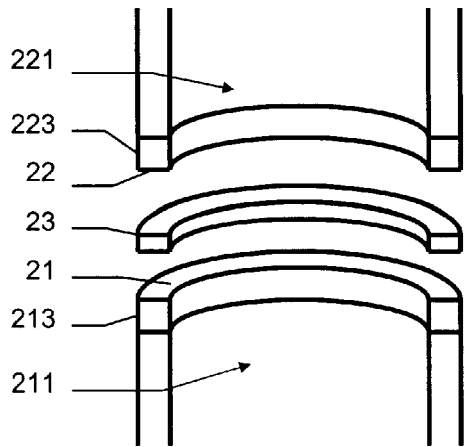
FIG. 2(a,b,c) depict brazing and disassembly according to the present invention.

FIG. 2a shows two components 221, 211 to be joined. Components 221, 211 have interfaces 223, 213 affixed thereto. Interfaces 223, 213 are affixed to components 221, 211 so that respective opposing surfaces 22, 21 thereof can be joined by subsequent brazing. A brazing alloy 23 is placed between surfaces 22, 21. Brazing alloy 23 can be applied as a paste, as a formed solid piece, or by other suitable processes. Interfaces 223, 213 can be joined to components 221, 211 in various ways. For example, they can be joined mechanically as by matching threads, or by welding. As another example, they can be joined by brazing. Brazing interfaces 223, 213 to components 221, 211, respectively, can result in a strong, hermetic joint. The braze alloy chosen for the interface to component braze joint should have a higher melting temperature than that chosen for the interface-to-interface joint so that reheating and disassembly of the interface-to-interface joint does not compromise the integrity of the interface to component joint.

Figure 2B:
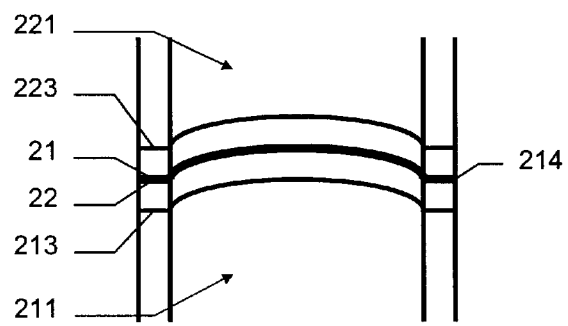

FIG. 2b shows components 221, 211 after brazing. Surfaces 22, 21 of interfaces 223, 213 are joined together with brazing alloy 23 (not shown). The resulting braze joint 214 can exhibit strength and permeability comparable to that of components 221, 211. The braze alloy for the interface-to-interface joint 214 can be chosen so that it does not result in intermetallic phase formation with the interface materials. The braze alloy can also be chosen so that it does not preferentially attack the grain boundaries of the interface materials. The interface surfaces should be clean and substantially free of oxide before brazing.

Figure 2C:
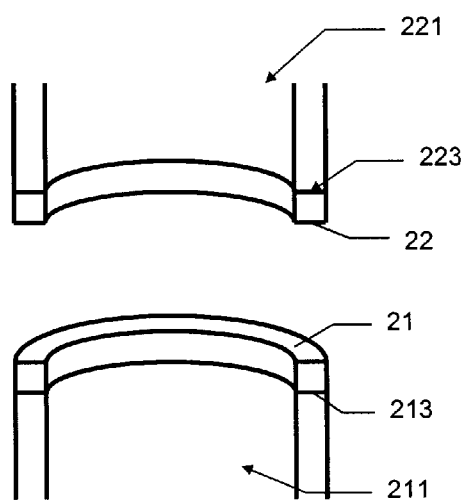

FIG. 2c shows components 221, 211 after heating and disassembly. Heating to the temperature required to melt the braze alloy (not shown) allows surfaces 22, 21 of interfaces 223, 213 to be separated. With proper choice of the interface material and braze alloy, interfaces 223, 213 have substantially unaltered physical structures after brazing and subsequent disassembly. Consequently, the brazing process can be repeated with little degradation in the quality of the resulting brazed joint.

The selection of interface material, component to interface joint braze alloy, and interface-to-interface braze alloy is important to the reliability of subsequent rebrazing. Generally, commercial purity elemental metals such as nickel, palladium, platinum, gold, silver, and copper, are suitable for use as interface materials. Component materials such as 304 stainless steel (UNS #S30400), 304L stainless steel (UNS #S30403), and UNS #S21800, and various combinations thereof can be joined to interfaces of Nickel-200 (UNS #N02200) or Nickel-201 (UNS #N02201) with high temperature braze alloys such as BNi-5. BNi-5 has a nominal composition of 19% chromium, 10% silicon, and 71% nickel, and a melting temperature of 1149° C. to 1204° C. The Nickel-200 interfaces can be relatively thin in the direction normal to the joint surfaces (for example, about 0.125 inch). They should be clean and free of oxide prior to brazing. They can be brazed to the components in a vacuum, or in an inert gas or partial hydrogen atmosphere in a brazing furnace, by induction brazing, or by any other process where the proper heating and atmosphere can be maintained. Commercial brazing fluxes can be used in some applications instead of controlled atmospheres. The interface materials can also be welded to the components using processes such as those published by the American Welding Society, the American Society for Materials, or other comparable sources known to those skilled in the art.

Interfaces of Nickel-200 can be joined by low temperature braze alloys such as BAu-4. BAu-4 has a nominal composition of 82% gold and 18% nickel, and a melting temperature of 950° C. BAu-4 has a processing temperature range of 990° C. to 1050° C. Other suitable braze alloys include AWS BAg-8 and Incusil 15 (a trade designation from WESGO). The interface-to-interface braze joint can be formed by induction heating or by in-situ heaters in a controlled atmospheric chamber. The heating required for the interface-to-interface braze joint should not compromise the interface-to-component joint. The materials discussed result in a joint that can be rebrazed at least 20 times without significant physical degradation of the components, the interfaces, or the resulting joint integrity.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of reversibly brazing components, comprising:
   a) attaching an interface piece to each component; and
   b) forming a reversible brazed joint by brazing the interfaces together using a first braze alloy wherein the first braze alloy is made from a material that does not preferentially attack the interface grain boundaries during brazing and that does not result in intermetallic phase formation during brazing.

2. The method of claim 1 wherein the interfaces are made from elemental metal of at least commercial purity.

3. The method of claim 1 wherein the interfaces are attached to the components by brazing with a second braze alloy.

4. The method of claim 3 wherein the melting temperature of the second braze alloy is greater than the melting temperature of the first braze alloy.

5. The method of claim 1 wherein the interfaces are attached to the components by welding.

6. The method of claim 1 wherein brazing the interfaces together comprises:
   a) applying the first braze alloy to at least one interface;
   b) bringing the interfaces into close proximity to each other;
   c) heating the interfaces and the first braze alloy above the melting point of the first braze alloy; and
   d) cooling the interfaces and the first braze alloy below the melting point of the first braze alloy.

7. The method of claim 1 wherein the first braze alloy is chosen from the group consisting of:
   BAu-4, BAg-8, and Incusil-15.

8. The method of claim 7 wherein the interfaces are made from a material chosen from the group consisting of: UNS #N02200, UNS #N02201.

9. A method of reversibly brazing two surfaces, comprising:
   a) brazing, with a first braze alloy, an interface to each of the two surfaces; and
   b) brazing the two interfaces together with a second braze alloy, wherein the second braze alloy is made from a material that does not preferentially attack the interface grain boundaries during brazing and that does not result in intermetallic phase formation during brazing.

10. The method of claim 9 wherein the melting point of the second braze alloy is less than the melting point of the first braze alloy.

11. The method of claim 9 wherein the interfaces are made from elemental metal of at least commercial purity.

12. A method of reversibly brazing components, comprising:
   a) attaching an interface piece to each component;
   b) forming a first reversible brazed joint by brazing the interfaces together using a first braze alloy, wherein the first braze alloy is made from a material that does not preferentially attack the interface grain boundaries during brazing and that does not result in intermetallic phase formation during brazing;
   c) heating the reversible brazed joint above the melting temperature of the first braze alloy and separating the two components;
   d) forming a second reversible brazed joint by brazing the interfaces together using a second braze alloy.

13. The method of claim 12 wherein the first braze alloy and the second braze alloy are made of the same material.

14. The method of claim 12 wherein the interfaces are brazed to form the first reversible brazed joint in an atmosphere chosen from the group consisting of: an oxygen free atmosphere, and an oxygen reducing atmosphere.

15. The method of claim 12 wherein the interfaces are brazed to form the second reversible brazed joint in an atmosphere chosen from the group consisting of: an oxygen free atmosphere, and an oxygen reducing atmosphere.

16. The method of claim 12 wherein the interfaces are brazed to form the first reversible brazed joint after covering the interface surfaces with brazing flux.

17. The method of claim 12 wherein the interfaces are brazed to form the second reversible brazed joint after covering the interface surfaces with brazing flux.

18. The method of claim 1 wherein the interfaces are brazed to form the reversible brazed joint in an atmosphere chosen from the group consisting of: an oxygen free atmosphere, and an oxygen reducing atmosphere.

19. The method of claim 1 wherein the interfaces are brazed to form the reversible brazed joint after covering the interface surfaces with brazing flux.

20. The method of claim 12 wherein the interfaces are made from elemental metal of at least commercial purity.

* * * * *